Sept. 27, 1927.  R. PECHKRANZ  1,643,900

ELECTROLYZER ELECTRODE OF THE FILTER PRESS TYPE

Filed March 9, 1927

Inventor:
R. Pechkranz
By Langner, Parry, Card & Langner
Attys.

Patented Sept. 27, 1927.

1,643,900

UNITED STATES PATENT OFFICE.

RODOLPHE PECHKRANZ, OF GENEVA, SWITZERLAND.

ELECTROLYZER ELECTRODE OF THE FILTER PRESS TYPE.

Application filed March 9, 1927, Serial No. 174,032, and in Switzerland February 5, 1926.

This invention relates to an electrolyzer electrode of the filter press type.

It comprises a body, made of a sheet metal or plate the maximum thickness of which is 1 mm., and a frame thicker than said sheet metal or plate.

Two constructional forms of the electrode are shown by way of examples in the accompanying drawing.

Figure 1:
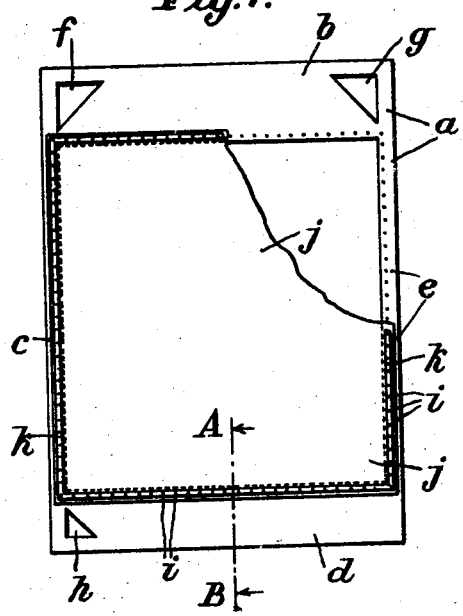
Figure 1 is a front elevation of the first constructional form on a small scale.
Figure 2:
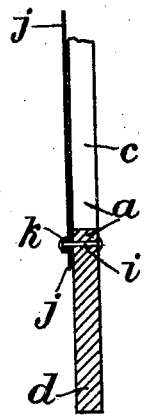
Figure 2 is a partial cross section of said form on a larger scale through line A—B of Figure 1.

The first constructional form (Figures 1 and 2) comprises a frame $a$ of rectangular shape made for instance of an iron plate or sheet covered with a thin layer of nickel and having a thickness of 4 mm.; the frame $a$ is obtained either by cutting out a plate of the desired dimensions or by autogenous welding of its various portions $b$, $c$, $d$, $e$ prepared separately. The portion $b$ has recesses $f$, $g$ intended to form conduits for the gases and the portion $d$ a recess $h$ belonging to the water feed and electrolyte circulation conduit. To the frame $a$ is secured by means of rivets $i$ a thin plate $j$, for instance 0.2 or 0,3 mm. thick, made of nickel or of nickel covered with a very thin layer of iron on the negative face in order to have the benefits of the less tension required by iron for the evolving of hydrogen. The rivets $i$ act on the thin plate $j$ by means of a strengthening piece $k$, and not directly.

It is easy to obtain, by rolling or electrolytic deposit on a level form, thin plates having the given thickness and perfectly level. On the other hand the fixing of the electrode between the corresponding diaphragms at the desired distance from the same, is effected quite easily with the assistance of the frame $a$: in fact, in view of the small thickness of the plate $j$ there could be no question of clamping it between two diaphragms as it is done for electrodes of thick plate.

The iron skin or film, the part $k$ could be done away with.

The fixing of the plate $j$ to the frame $a$ could be effected in some other manner, for instance by electric point welding.

The frame could be made of sectional iron to which the thin plate $j$ is secured by cementing, by electric welding—for instance point welding—by galvanoplastic adhesion obtained when manufacturing the electrodes or in some other manner; in the case of the galvanoplastic adhesion, the covering of the frame $a$ with a thin layer of nickel, the galvanoplastic preparation of the thin plate $j$ and a complete adhesion of both frame and plate to another are obtained at the same time by a single immersion into the galvanoplastic bath.

Figure 3:
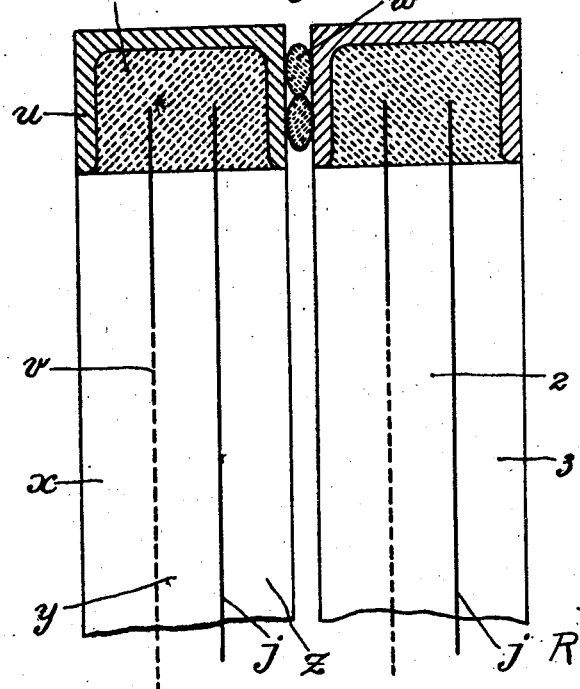
Figure 3 is a partial cross section of the second constructional form on a great scale.

The second constructional form (Figure 3) also comprises the thin metal sheet or plate $j$, having for instance a thickness of 0,2 or 0,3 mm., made of nickel or of nickel covered on the negative face with a thin layer of iron. The plate $j$ is secured by means of cement $t$ in a frame $u$ of rectangular shape made of U-shaped iron pieces; in this frame $u$ a diaphragm $v$ also is maintained by the cement $t$. The frames $u$ are placed side by side; between the same are packing pieces $w$ for obtaining tight joints. From the left to the right of Figure 3, there are a chamber $x$, where hydrogen is evolved, a diaphragm $v$, a chamber $y$, in which oxygen is evolved, the electrode $j$, an hydrogen chamber $z$, a diaphragm, an oxygen chamber 2, an electrode $j$, a hydrogen chamber 3, etc. The securing of the electrode $j$ is therefore obtained in said constructional form by the frame $a$ in which the diaphragm $v$ already is secured.

The plate $j$ could be strengthened at some other places than on its circumference.

What I claim is:

In an electrolyzer electrode of the filter press type, the combination with a plane sheet metal body the maximum thickness of which is 1 mm., of a frame thicker than said metal sheet, the latter being rigidly fixed to the frame in a true plane for the purpose of warranting a perfect plane of the thin sheet when the electrode is being handled for assembling in and disassembling from the apparatus, and in order to prevent a distortion of said thin sheet when assembled under pressure.

In testimony whereof I affix my signature.

RODOLPHE PECHKRANZ.